(12) United States Patent
Mochizuki et al.

(10) Patent No.: US 6,921,187 B2
(45) Date of Patent: Jul. 26, 2005

(54) VEHICLE LAMP WITH INDICATIVE MARK

(75) Inventors: Shinichi Mochizuki, Shizuoka (JP); Susumu Kakidaira, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 95 days.

(21) Appl. No.: 10/191,162

(22) Filed: Jul. 9, 2002

(65) Prior Publication Data

US 2003/0012023 A1 Jan. 16, 2003

(30) Foreign Application Priority Data

Jul. 10, 2001 (JP) .................................... P. 2001-208712

(51) Int. Cl.⁷ ................................................ F21V 7/00
(52) U.S. Cl. .................. 362/514; 362/496; 362/516; 362/540; 362/543
(58) Field of Search ................................ 362/514, 516, 362/496, 538, 540, 543, 544

(56) References Cited

U.S. PATENT DOCUMENTS

| | | | |
|---|---|---|---|
| 4,533,860 A | | 8/1985 | Saito |
| 5,546,283 A | * | 8/1996 | Ohtsuka et al. ............... 362/61 |
| 5,642,228 A | | 6/1997 | Takezawa et al. |
| 5,671,997 A | * | 9/1997 | Potts ........................... 362/84 |

FOREIGN PATENT DOCUMENTS

| | | |
|---|---|---|
| FR | 2799167 A | 4/2001 |
| FR | 2799527 A | 4/2001 |
| JP | 2001-176311 | 6/2001 |

OTHER PUBLICATIONS

Patent Abstracts of Japan, vol. 1999, No. 09, Jul. 30, 1999 and JP 11 111008A (Koito Mfg. Co. Ltd.).

* cited by examiner

*Primary Examiner*—Stephen Husar
*Assistant Examiner*—Anabel Ton
(74) *Attorney, Agent, or Firm*—Fish & Richardson PC

(57) ABSTRACT

A vehicle lamp including light sources, a reflective mirror for effecting desired light distribution by reflecting light emitted from the light sources and a lens disposed in front of the reflective mirror. In the vehicle lamp, the reflective mirror has a dummy portion which makes no contribution to effecting light distribution and is exposed to the outside through the lens, and an indicative mark for identifying the lighting device is formed integrally with the dummy portion. As the indicative mark can be visually recognized from the outside through the lens, the indicative mark needed not be formed on the lens. When lighting devices having different light distribution characteristics are provided, it is only needed to produce reflective mirrors respectively having corresponding indicative marks and the rest of the parts including the lens and the lamp body can be provided for common use.

6 Claims, 6 Drawing Sheets

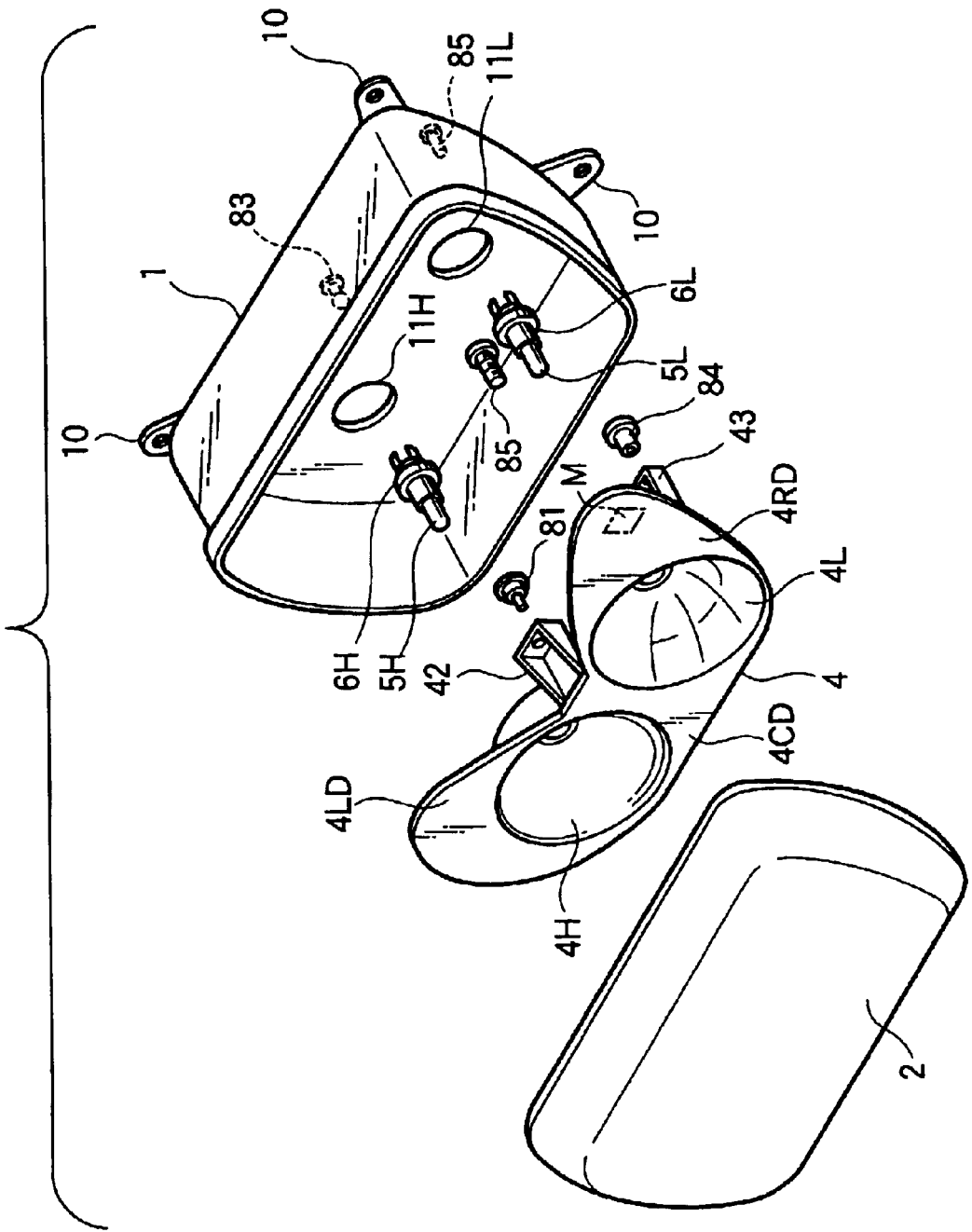

VEHICLE LAMP WITH INDICATIVE MARK

BACKGROUND OF THE INVENTION

1. Field of the Invention

The present invention relates to a vehicle lamp and particularly to a vehicle lamp having an indicative mark such as a recognition mark for identifying itself or a certification mark for indicating that it meets the standard required.

2. Description of the Related Art

Vehicle lamps may be required to have indicative marks such as recognition marks for indicating the kinds and models of the lamps involved or certification marks for indicating that the lamps involved have met the standards. For example, headlamps of two-wheeled vehicles are manufactured so that they correspond with the keep-to-the-left traffic in Britain and with the keep-to-the-right traffic in other European countries and they direct the low beams of headlamps leftward (hereinafter called the leftward light distribution) and also rightward (hereinafter called the rightward light distribution), respectively. Consequently, such a headlamp is required to have a certification mark (E-mark) for indicating that the lighting device conforms to the European standard and in order to discriminate between the leftward light distribution and the rightward light distribution, a light distribution mark in the form of a leftward arrow together with the certification mark is needed to be put in the case of a lighting device for effecting the leftward light distribution. When the certification mark including the light distribution mark (hereinafter referred to as the certification mark inclusive of the light distribution mark in this specification) is thus put on a headlamp, the certification mark of the headlamp for leftward light distribution has to be different from that of the headlamp for rightward light distribution.

Heretofore, two techniques have been employed for putting different certification marks of the sort mentioned above on light devices. The first technique is a technique for stamping a hallmark integrally on the surface of the lens of a lighting device. More specifically, an insert die is used as a part of the die for use in forming a lens. By selecting the insert die for forming a certification mark for rightward light distribution or leftward light distribution, the insert die is set in the die so as to form the lens; otherwise a certification mark is stamped on the surface of a lens by laser marking using a laser beam. In the case of using this technique for showing a certification mark on a headlamp, it is possible to confirm that the headlamp has met the standard by visually recognizing the certification mark formed on the surface of the lens of the headlamp and that the headlamp has proper light distribution characteristics. According to the second technique, two certification marks respectively for rightward light distribution and leftward light distribution are formed together with a lens. Further, a mark for discriminating between the leftward light distribution and the rightward light distribution is stamped or sealed on the body side of a lighting device in which the lens is mounted. When the lens is incorporated into the body of the lighting device, one of the two certification marks of the lens is recognized by reference to an identification mark on the body of the lighting device. Therefore, it is also possible to confirm that the headlamp has met the standard by visually recognizing the certification mark formed on the surface of the lens of the headlamp and that the headlamp has proper light distribution characteristics by reference to the identification mark on the body of the lighting device.

With the application of the insert die for forming the certification mark to the die for forming the lens according to the first technique, a die mark tends to be produced along the periphery of the insert die, thus deteriorating the appearance of the lens. Moreover, since unevenness is produced on the lens because of the certification mark or the die mark, part of the distribution of light transmitted through the area concerned is abnormally refracted, which results in generating glaring light. Further, two kinds of lenses for rightward light distribution and leftward light distribution respectively formed with different certification marks are necessary. Moreover, as different reflectors respectively for rightward light distribution and leftward light distribution are used, the number of parts forming the respective lamps for rightward light distribution and leftward light distribution together with the lenses and reflectors increases. Accordingly, this causes manufacturing and controlling costs to rise. Moreover, the production efficiency is extremely lowered by the use of laser marking. According to the second technique, on the other hand, the problem of deteriorating the external appearance and that of producing glaring light still remains to be solved though one kind of lens is used. As the identification mark for identifying the certification mark is needed to be formed on the body side of the lighting device, the man power required for this process rebounds on an increase in production cost.

SUMMARY OF THE INVENTION

An object of the invention is to provide a vehicle lamp intended to solve the foregoing problems with the formation of an indicative mark on a lens and to prevent the generation of glaring light. Another object of the invention is to provide a vehicle lamp designed to curtail the number of parts and to reduce production cost with a lens for common use when lighting devices having different light distribution characteristics are produced.

The present invention provides a vehicle lamp including light sources, a reflective mirror for effecting desired light distribution by reflecting light emitted from the light sources and a lens disposed in front of the reflective mirror. The vehicle lamp is characterized in that the reflective mirror has a dummy portion which makes no contribution to effecting light distribution and is exposed to the outside through the lens and that an indicative mark for identifying the lighting device is formed integrally with the dummy portion. The indicative mark is a mark for discriminating among a plurality of different light distribution characteristics of the reflective mirror. Particularly, the indicative mark is preferably a certification mark for discriminating between the leftward light distribution and the rightward light distribution of the reflective mirror and for meeting the desired standards required for the lighting device.

According to the invention, the indicative mark is formed integrally with the dummy portion provided to the reflective mirror and can be visually recognized from the outside of the lighting device through the lens, so that the indicative mark need not be formed on the lens. Thus, the glaring light caused by the indicative mark is not generated. When lighting devices having different light distribution characteristics are produced, moreover, it is only needed to produce reflective mirrors respectively having corresponding indicative marks and the rest of the parts including the lens and the lamp body can be provided for common use, whereby the number of parts is minimized and cost reduction is realizable.

BRIEF DESCRIPTION OF THE DRAWINGS

FIG. 4 is a schematic perspective view broken into parts.

DETAILED DESCRIPTION OF THE PREFERRED EMBODIMENTS

Figure 1:
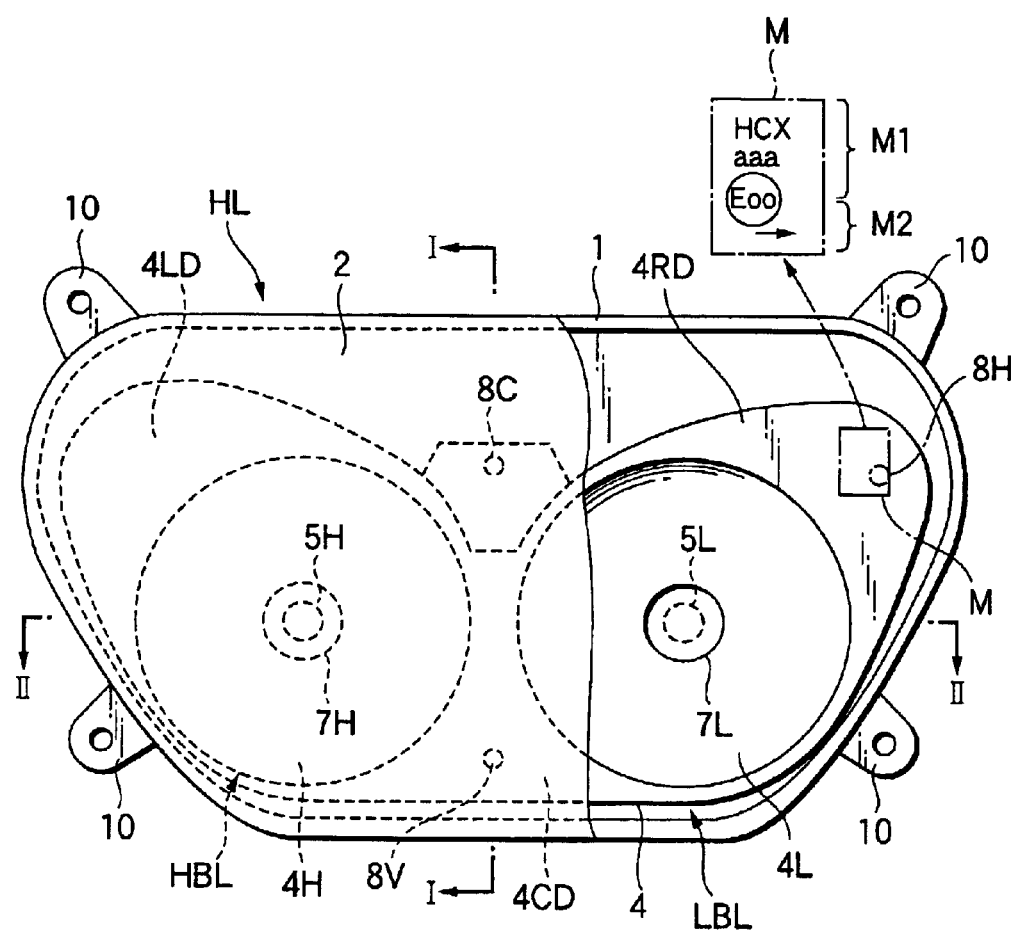
FIG. 1 is a fragmentary broken elevational view of the embodiment of the invention applied to a two-lamp type headlamp of a two-wheeled vehicle.
Figure 2:
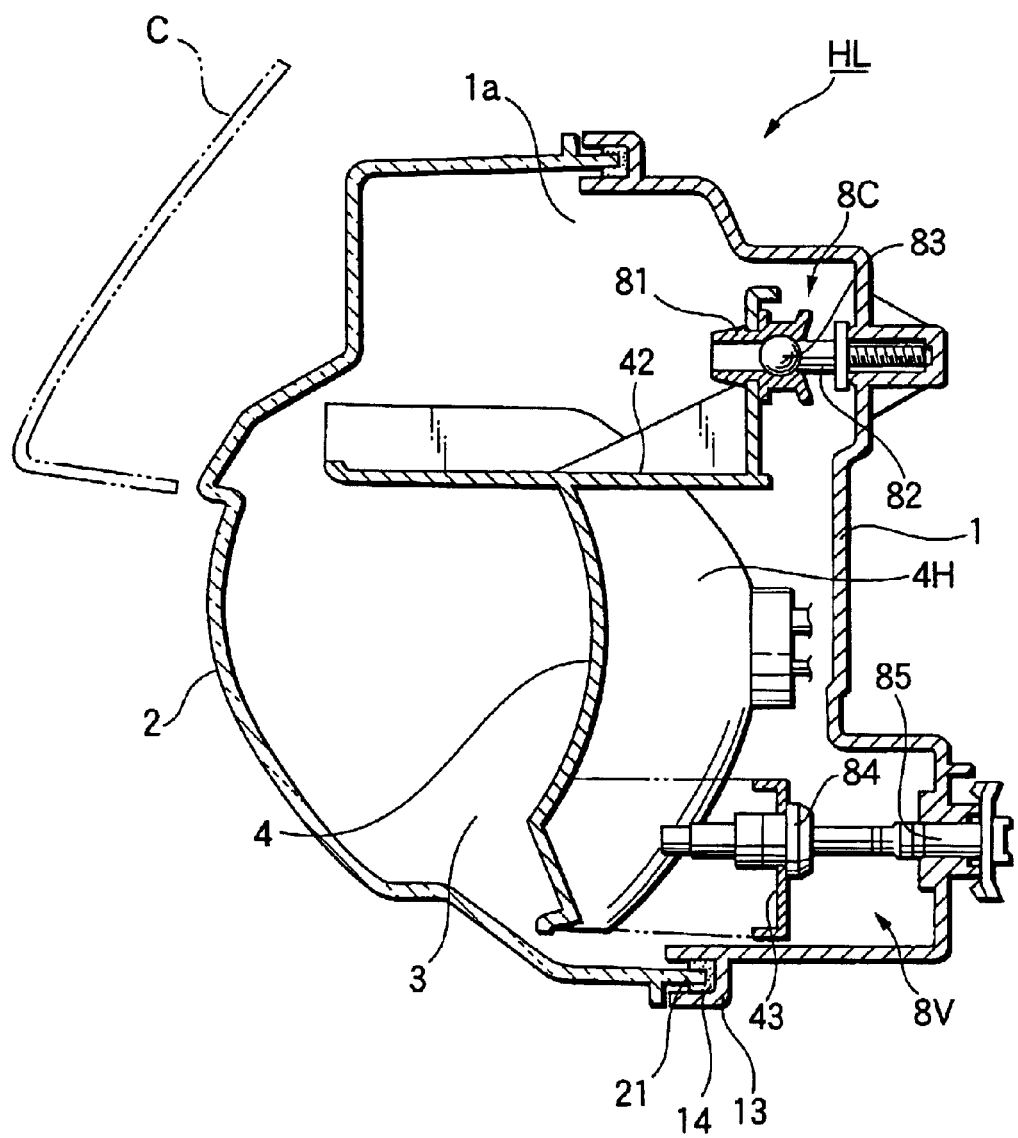
FIG. 2 is a sectional view taken on line I—I of FIG. 1.
Figure 3:
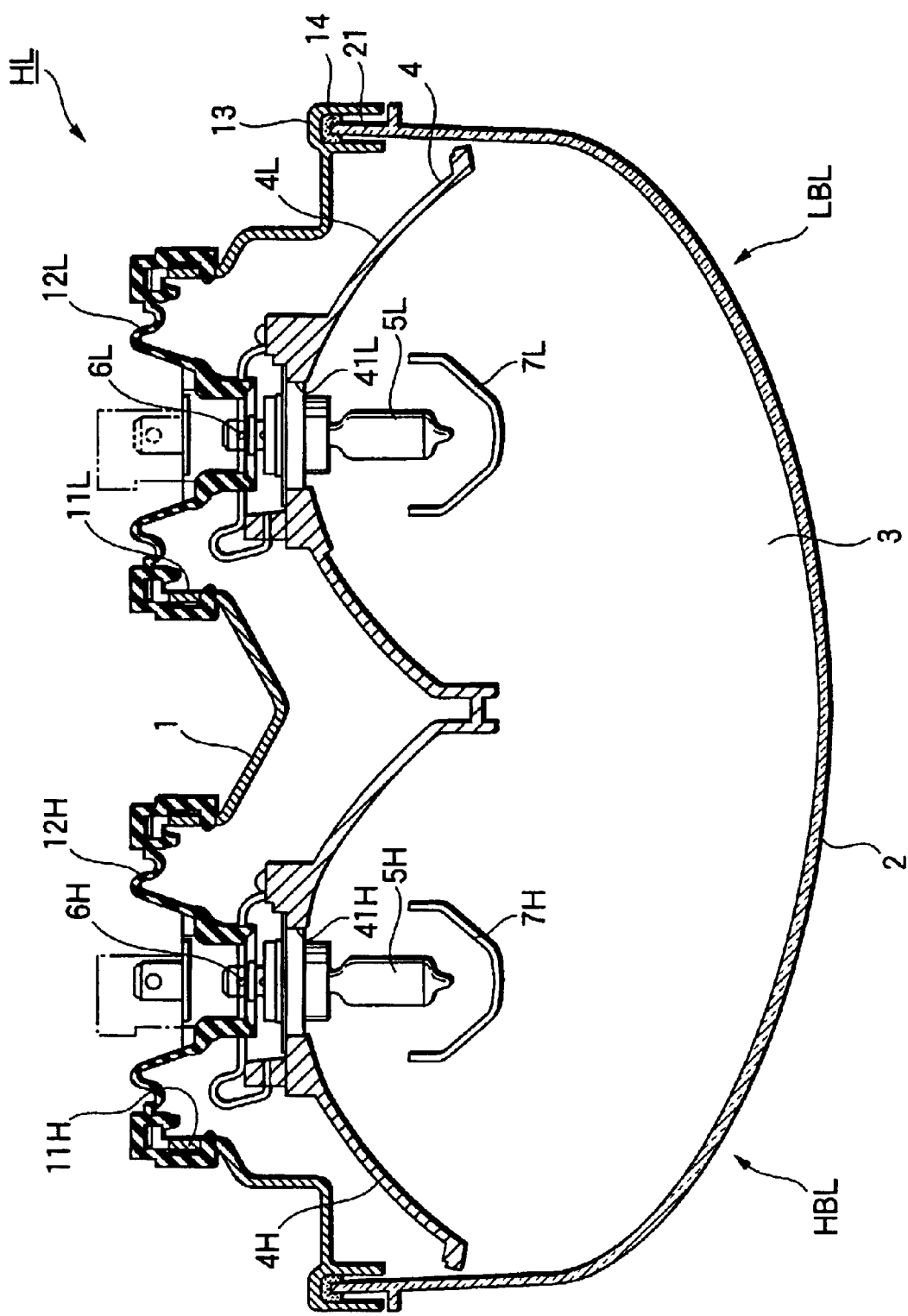
FIG. 3 is a sectional view taken on line II—II of FIG. 1.

An embodiment of the invention will now be described by reference to the drawings. FIG. 1 is a fragmentary broken elevational view of the embodiment of the invention applied to a two-lamp type headlamp of a two-wheeled vehicle; FIG. 2, a sectional view taken on line I—I of FIG. 1; FIG. 3, a sectional view taken on line II—II of FIG. 1; and FIG. 4, a schematic perspective view broken into parts. In these drawings, a headlamp HL has a high beam lamp HBL on the left-hand side in the elevational view and a low beam lamp LBL on the right-hand side therein that are horizontally disposed. A lamp chamber 3 is formed with a lamp body 1 mounted in the front portion of the body of a two-wheeled vehicle (not shown) and a lens 2 fitted into the front opening 1a of the lamp body 1, a reflector 4 being installed inside the lamp chamber 3. A bracket 10 is formed integrally with the lamp body 1 at a plurality of places close to the back of the lamp body and these brackets 10 is utilized to fit the lamp body 1 to the body of the two-wheeled vehicle.

Figure 5A:
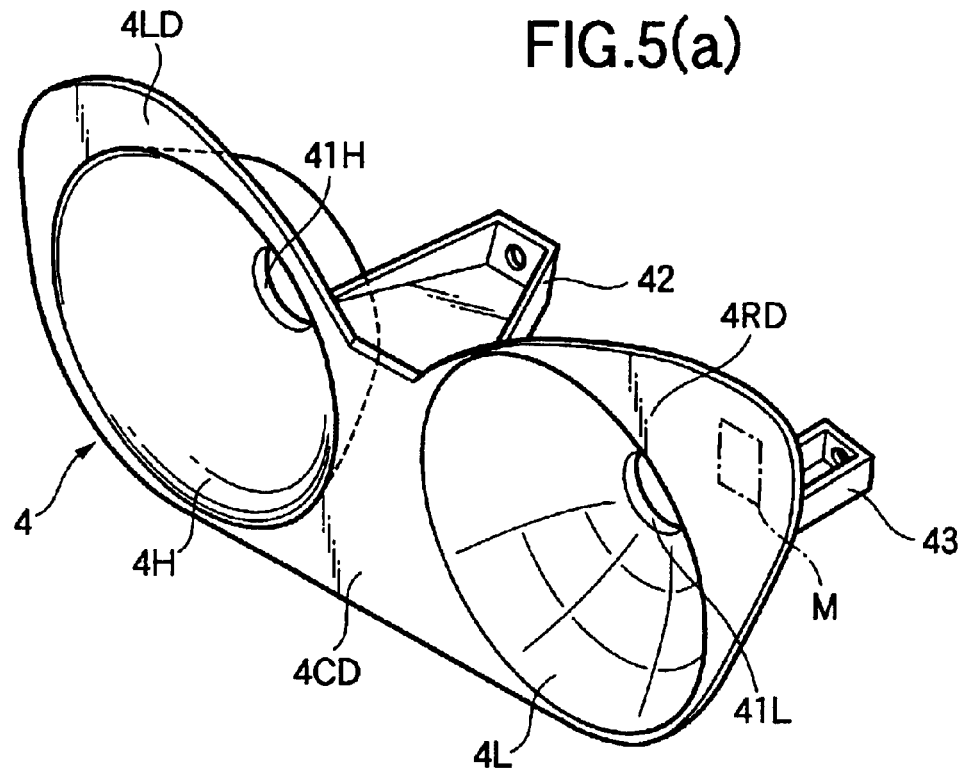
FIGS. 5(a) and 5(b) are enlarged perspective views of a reflector seen from the front and rear directions.
Figure 5B:
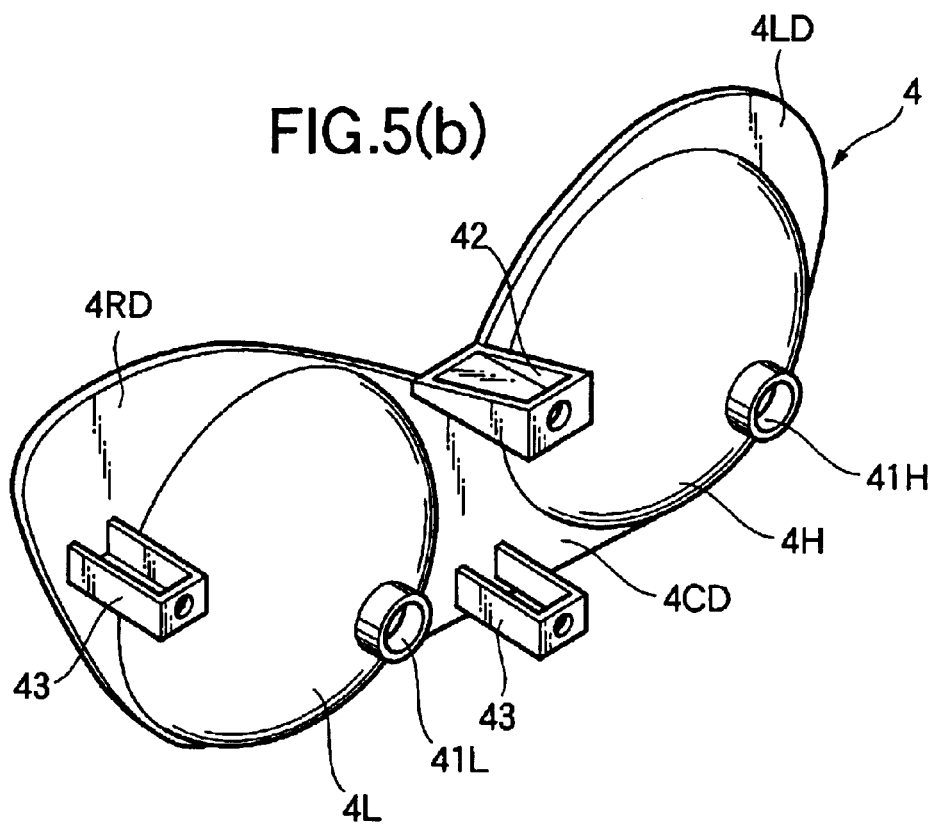

As shown in enlarged perspective views of FIGS. 5(a) and 5(b), the reflector 4 seen from front and rear directions has two reflector portions arranged laterally and integrally; namely, a low-beam reflector portion 4L on the right-hand side in the elevational view and a high-beam reflector portion 4H on the left-hand side therein are formed by resin-molding with their surfaces subjected to aluminum deposition so as to form the respective reflective surfaces. In this case, two kinds of reflectors 4 are manufactured, including one reflector in which a low-beam reflector portion 4L effects leftward light distribution for use in Britain or effects rightward light distribution in other European countries. The two kinds of the reflectors 4 are selectively incorporated into a lamp body 1 as occasion demands. Bulb fitting holes 41H and 41L are bored in the back of the high-beam reflector portion 4H and the low-beam reflector portion 4L. A high beam bulb 5H and a low beam bulb 5L are supported by bulb sockets 6H and 6L and detachably fitted into the respective bulb fitting holes 41H and 41L. As shown in FIG. 3, bulb through-holes 11H and 11L are bored in the back of the lamp body 1 in positions corresponding to the respective reflector portions 4H and 4L. The bulbs 5H and 5L are made detachable via the bulb through-holes 11H and 11L and watertightly sealed. Moreover, shades 7H and 7L for limiting direct light from the bulbs are provided to the respective high and low-beam reflector portions.

Further, the reflector 4 has a dummy portion in an area other than the high-beam reflector portion 4H and another dummy portion in an area other than the low-beam reflector portion 4L. In other words, the dummy portions include a central dummy portion 4CD provided in an area between the high-beam reflector portion 4H and the low-beam reflector portion 4L, an upper left dummy portion 4LD and an upper right dummy portion 4RD provided on the upper left and right sides of the respective reflector portions 4H and 4L. The gap excluding the upper side portion of the gap between the reflector portions 4H and 4L and the lamp body 1 is covered with these dummy portions 4CD, 4LD and 4RD, so that the gap concerned is not exposed to the outside via the lens 2. Accordingly, an external configuration ranging from both sides and lower side of the reflector 4 conforms to what is formed along the front opening 1a of the lamp body 1, that is, what is formed along the lens 2. Moreover, the dummy portions 4CD, 4LD and 4RD are subjected to aluminum deposition like the reflective surfaces of the respective high and low reflector portions 4H and 4L and have an external appearance as a part of the reflector 4.

The dummy portions 4CD, 4LD and 4RD are extended along the inner face of the lens 2 and a certification mark M is formed in one of the dummy portions, that is, on the surface of the upper right dummy portion 4RD in the elevational view according to this embodiment of the invention. As shown in FIG. 1, the certification mark M includes an indicative mark M1 showing that the headlamp meets the desired standard and an indicative mark M2 showing that the headlamp effects the rightward light distribution or leftward light distribution. FIG. 1 shows an example of the certification mark indicating the leftward light distribution. The certification mark M (though its illustration is omitted) is formed simultaneously and integrally when the resin-molded reflector 4 is formed by is forming a die for forming the certification mark in a part of a die for forming the reflector 4 by resin-molding. More specifically, in the case of a reflector designed for the low-beam reflector portion 4L to effect the rightward light distribution, a certification mark indicative of rightward light distribution is formed integrally with the dummy portion 4RD. In the case of a reflector designed for effecting the leftward light distribution, the certification M indicative of the leftward light distribution shown in FIG. 1 is formed integrally with the dummy portion 4RD.

On the other hand, the reflector 4 is supported by an aiming adjusting mechanism 8 in the body 1. As shown in FIG. 1, the aiming adjusting mechanism 8 has a fulcrum portion 8C, a horizontal (lateral) aiming portion 8H and a vertical aiming portion 8V. As shown in FIG. 2, the fulcrum portion 8C is disposed in a substantially central upper portion in the elevational view of the reflector 4 and a ball bearing 81 is fitted to part of an L-shaped aiming leg 42 projecting in the rear of the reflector 4. Further, the ball portion 83 of a ball shaft 82 projecting forward is fitted in a place corresponding to the inner face of the lamp body 1, and with this ball bearing structure, the reflector 4 is supported tiltably in the horizontal and vertical directions. The vertical aiming portion 8V is situated in the back of the central dummy portion right below the fulcrum portion 8C, and a nut 84 is integrally supported by an aiming leg 43 projecting backward from the back of the reflector 4. An aiming screw 85 projecting inward from the back side in a corresponding place of the lamp body 1 is screwed into the nut 84. Consequently, the reflector 4 is tilted vertically with the fulcrum portion 8C as a fulcrum by turning the aiming screw 85 to axially move the nut 84 whereby to adjust the optical axis in the vertical direction. Further, though the horizontal aiming portion 8H is disposed in the back of the upper right dummy portion 4RD with a predetermined distance in the horizontal direction of the is fulcrum portion 8C, as the arrangement of the horizontal aiming portion is the same as that of the vertical aiming portion 8V, the description thereof will be omitted. In this case, like elements shown in the drawing are given like reference numerals in the horizontal aiming portion 8H. The reflector 4 is tilted by the horizontal aiming portion in the horizontal direction whereby to adjust the optical axis of each lamp in the horizontal direction.

The lens 2 is formed as a so-called clear lens with no lens steps being formed thereon. More specifically, a seal leg 21 provided along the peripheral edge of the lens 2 is inserted into a seal groove 13 provided along the opening edge of the front opening 1a of the lamp body 1 and fixedly sealed with a sealing compound. Since the clear lens is formed as the lens 2, the inner portion of the lamp chamber 3 can be visually recognized through the lens 2; that is, the surface of the reflector 4 can be visually recognized from the outside on the front side of the headlamp HL, so that the certification mark M formed on the surface of the reflector 4 is made visually recognizable. The upper face portion of the reflector 4 is also exposed outside through the lens 2 according to this embodiment of the invention. When the headlamp HL is mounted on the two-wheeled vehicle as shown in FIG. 2, the upper portion of the headlamp HL is hidden from sight with a cowl for covering a part of the upper side of the lens 2, whereby the external appearance of the headlamp is not deteriorated.

Figure 6:
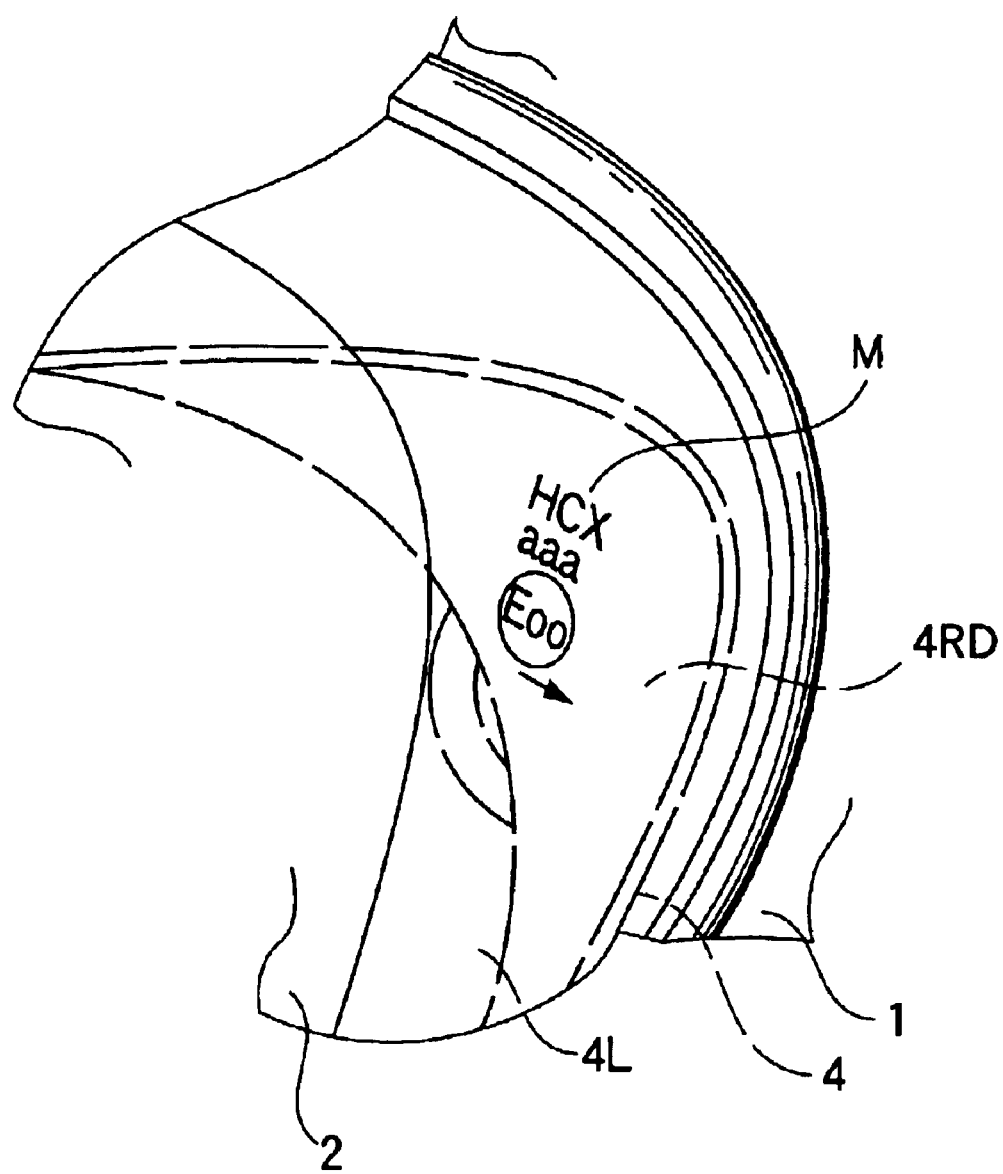
FIG. 6 is an exemplary enlarged perspective view of the principal part of the headlamp of FIG. 1.

As the certification mark M is formed integrally on the surface of the upper right dummy portion 4RD provided to the reflector 4 in the headlamp HL according to this embodiment of the invention, the certification mark M can be visually recognized from the outside of the headlamp HL through the lens as shown in FIG. 6 in such a condition that the headlamp HL has been constructed. The dummy portions 4CD, 4LD and 4RD are disposed along the inner face of the lens 2 and the certification mark M is also positioned is close to the inner face of the lens 2, so that the certification mark is easily recognized visually through the lens 2. Therefore, the certification mark for recognizing the headlamp HL need not be formed on the lens 2 of the headlamp HL, and the glaring light is prevented from being generated in such a case that the certification mark is formed on the lens 2. Moreover, as the reflector 4 is installed inside the lamp chamber 3 in the almost completely sealed-up condition, the certification mark M is not tainted with the passage of time and does not become illegible because of wear. When the headlamp HL is produced, moreover, though the reflector 4 has to be formed as a different part depending whether the rightward or leftward light distribution is effected in the low-beam reflector portion 4L, the rest of the parts including the lamp body 1 and the lens 2 can be provided for common use in headlamp for rightward light distribution or leftward light distribution, whereby the number of parts for use in manufacturing headlamps intended for areas different in light distribution characteristics is minimized.

When the low-beam reflector portion 4L is formed by resin-molding as what is for rightward light distribution or leftward light distribution, dies for forming the certification marks are incorporated in different dies respectively designed for rightward light distribution and leftward light distribution so that the certification mark can be formed simultaneously when each reflector for rightward light distribution or leftward light distribution is formed by resin-molding. Consequently, the provision of the insert die structure that has been problematical according to the first conventional technique becomes unnecessary and this results in not only simplifying the manufacturing process but also reducing the production cost. Further, since one certification mark M is formed on each reflector for rightward light distribution or leftward light distribution, any mark for recognizing the certification mark is unnecessary to stamp on the lamp body side unlike the process step taken in the second conventional technique, which is advantageous in further reducing the production cost by curtailing the man power required.

According to this embodiment of the invention, the aiming leg 43 of the horizontal aiming portion 8H is formed backward integrally with the back of the upper right dummy portion 4RD of the reflector 4 having the certification mark M. Consequently, a sink mark is caused by the aiming leg 43 to appear on the surface of the upper right dummy portion 4RD at the time of resin-molding the reflector. However, the advantage is that the sink mark is made less conspicuous by forming the certification mark M on the surface of that portion. With regard to the central dummy portion 4CD where the aiming leg 43 of the vertical aiming portion 8V, the sink mark problem can be dealt with by adding decorative markings to the surface, for example. Needless to say, the certification mark M may needless to say be formed in the upper left dummy portion 4LD without having the aiming leg in a case where the sink mark caused by the aiming leg is less conspicuous on the surface of the dummy portion. When the certification mark is formed in the upper left dummy portion 4LD on the side of the high-beam reflector portion 4H, the reflective surface of the low-beam reflector portion 4L that requires a cut line for light distribution is less affected by resin flow at the time of molding the certification mark M, whereby light distribution characteristics with the accurate cut line are obtainable.

Although the invention is applied to the two-lamp type headlamp according to this embodiment of the invention, it may be applicable likewise to not only a single-lamp type headlamp but also what does not include the aiming mechanism. In a headlamp formed with the inner face of a lamp body as a reflective surface, that is, a reflector, a face that does not function as the reflective surface of the reflector, that is, a dummy portion may be formed. If the dummy portion is visually recognized from the outside through a lens, a certification mark may be formed on the surface of the dummy portion.

Although a description has been given of an example in which the certification mark is formed on the headlamp, the invention is applicable to lighting devices having various indicative marks required to be carried with them for discriminating between a plurality of lighting devices whose reflectors are formed according to different standards such as kinds and models of lighting devices. Moreover, though the indicative mark is molded integrally with the reflector according to the above embodiment of the invention, such a mark may be formed by laser marking or stamping after the reflector is formed.

As set forth above, according to the invention, the indicative mark is formed integrally with the dummy portion provided to the reflective mirror and can be visually recognized from the outside of the lighting device through the lens, so that the indicative mark need not be formed on the lens. Thus, the glaring light caused by the indicative mark is not generated. When lighting devices having different light distribution characteristics are produced, moreover, it is only needed to produce reflective mirrors respectively having corresponding indicative marks and the rest of the parts including the lens and the lamp body can be provided for common use, whereby the number of parts is minimized and cost reduction is realizable.

What is claimed is:

1. A vehicle lamp comprising:
   a light source;
   a reflective mirror for effecting desired light distribution by reflecting light emitted from said light source; and
   a lens disposed in front of said reflective mirror,
   wherein said reflective mirror includes a dummy portion making no contribution to effecting light distribution and exposed to an visible from outside of the vehicle lamp through said lens, and wherein an indicative mark for identifying the vehicle lamp is formed integrally with said dummy portion.

2. The vehicle lamp according to claim 1, wherein said indicative mark is a mark for discriminating among a plurality of different light distribution characteristics of said reflective mirror.

3. The vehicle lamp according to claim 2, wherein said indicative mark is a certification mark for discriminating between a leftward light distribution and a rightward light distribution of said reflective mirror and for indicating that the vehicle lamp conforms to a required standard.

4. The vehicle lamp according to claim 1, wherein said lens is a clear lens with no lens steps being formed thereon.

5. The vehicle lamp according to claim 1, further comprising:

an aiming adjusting mechanism supporting said reflective mirror for adjusting an optical axis of said light source, said aiming adjusting mechanism including a aiming leg provided integrally with a back surface of said dummy portion, wherein said indicative mark is provided on a front surface of said dummy portion and opposite to said aiming leg.

6. The vehicle lamp according to claim 1, further comprising:

a leg portion provided integrally with a back surface of said dummy portion; and a lamp body to which said reflective mirror is attached via said leg portion, wherein said indicative mark is provided on a front surface of said dummy portion and opposite to said leg portion.

* * * * *